United States Patent [19]

Lutz et al.

[11] 4,390,203

[45] Jun. 28, 1983

[54] VEHICLE ROOF AND HEADLINING THEREFOR

[75] Inventors: Alfons Lutz, Emmering; Georg Kohlpainter, Maisach, both of Fed. Rep. of Germany

[73] Assignee: Webasto-Werk W. Baier GmbH & Co., Fed. Rep. of Germany

[21] Appl. No.: 226,825

[22] Filed: Jan. 21, 1981

[30] Foreign Application Priority Data

Jan. 23, 1980 [DE] Fed. Rep. of Germany ....... 3002246

[51] Int. Cl.³ .............................................. B60J 7/02
[52] U.S. Cl. .................................... 296/223; 296/214
[58] Field of Search .............. 296/214, 223; 16/110 R

[56] References Cited

U.S. PATENT DOCUMENTS

| | | | |
|---|---|---|---|
| 3,203,730 | 8/1965 | Chupick | 296/214 |
| 4,023,858 | 5/1977 | Bienert et al. | 296/223 |
| 4,175,785 | 11/1979 | Leiter | 296/214 |
| 4,219,232 | 8/1980 | Kouth | 296/223 |
| 4,294,134 | 10/1981 | Mori et al. | 296/223 |

Primary Examiner—Richard A. Bertsch
Attorney, Agent, or Firm—Antonelli, Terry & Wands

[57] ABSTRACT

An automobile roof with an aperture and a closure panel that is displaceable for opening and closing the aperture by means of a crank handle mechanism or a motorized drive mechanism and a roof headliner for use therewith of the type comprised of a rigid, resilient material are constructed so that the same roof headliner can be utilized for covering the underside of the roof regardless of whether the crank handle mechanism or the motorized drive mechanism are utilized as the drive for the displaceable panel. According to a preferred embodiment, the headliner is provided with a cutout through means of which a foldable crank arm mechanism is attachable to a shaft of a gear box of the panel displacement mechanism. Furthermore, a cover shield is provided for covering the perforation when a motorized drive mechanism is utilized instead of a crank handle device.

9 Claims, 3 Drawing Figures

VEHICLE ROOF AND HEADLINING THEREFOR

BACKGROUND AND SUMMARY OF THE INVENTION

The invention relates to an automobile roof with a roof aperture which can be closed by a panel that is slidably displaceable and/or capable of being swung upwardly out of the plane of the aperture by means of a crank handle mechanism or a motorized drive mechanism, and with a roof headliner covering the underside of the roof and consisting of a rigid, resilient material, this headliner comprising a cutout corresponding essentially to the roof aperture.

Headliners of a rigid, springy material, i.e. so-called prefabricated headliners (German Utility Model 7,709,851) exhibit an advantage over previously customary fabric headliners in that they can be installed at considerably reduced expense.

On the other hand, crank handle mechanisms for sliding roofs have been known (DAS[German Published Application]1,219,342) exhibiting a crank arm arranged on a rotatable hub and foldable into a dish-like hiding niche. The hub and the crank arm are seated in a handle plate arranged concentrically to the crank axle in a perforation of a sheet-metal wall covered with headliner fabric. Apart from the fact that the fabric headliner can be mounted only with relatively great expense, this solution requires an additional handle plate. Besides, it has heretofore been necessary to provide headliners for use in connection with closure panels with a hand crank mechanism that are constructed differently from those for use with closure panels having a motor drive mechanism.

The present invention is based on the object of providing an automobile roof requiring especially few individual parts, wherein assembly is furthermore simplified, and permitting the use of the same headliner independently of whether the closure panel is equipped with a crank handle mechanism or a motor drive mechanism.

This object has been attained according to a preferred embodiment of the invention in that the roof headliner, consisting of a rigid, resilient material, is equipped in the zone lying in front of the front edge of the headliner cutout with a substantially circular perforation into which fits a round anchor plate for a foldable crank arm constituting part of a crank handle mechanism, this crank arm being received in the folded position by a hiding niche formed by the round anchor plate; and in that the perforation can be covered by a shield in case a motor drive mechanism is utilized.

In such a construction, the conventional handle plate is dispensed with. It is merely necessary to insert the headliner consisting of a rigid material. In the zone of the perforation of the headliner, it is then only required to attach the round anchor plate with crank arm to the crank axle of the crank handle mechanism, if such a crank handle mechanism is provided for the closure panel. The same prefabricated headliner can also be employed if a motorized drive mechanism is to be provided for the closure panel instead of a crank handle mechanism. In such a case, the perforation is simply covered by means of the shield.

The perforation rim is suitably formed by a preferably conically extending rabbet projecting in the direction toward the underside of the roof. Thus, with the round anchor plate attached, an extensively smooth roof underside can be realized.

The round anchor plate can advantageously comprise a hub, the outer diameter of which is smaller than the diameter of the perforation, and a radially projecting flange section lying underneath the perforation, the outer diameter of this flange section being larger than the diameter of the perforation. Thereby the perforation is covered by the flange of the round anchor plate.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
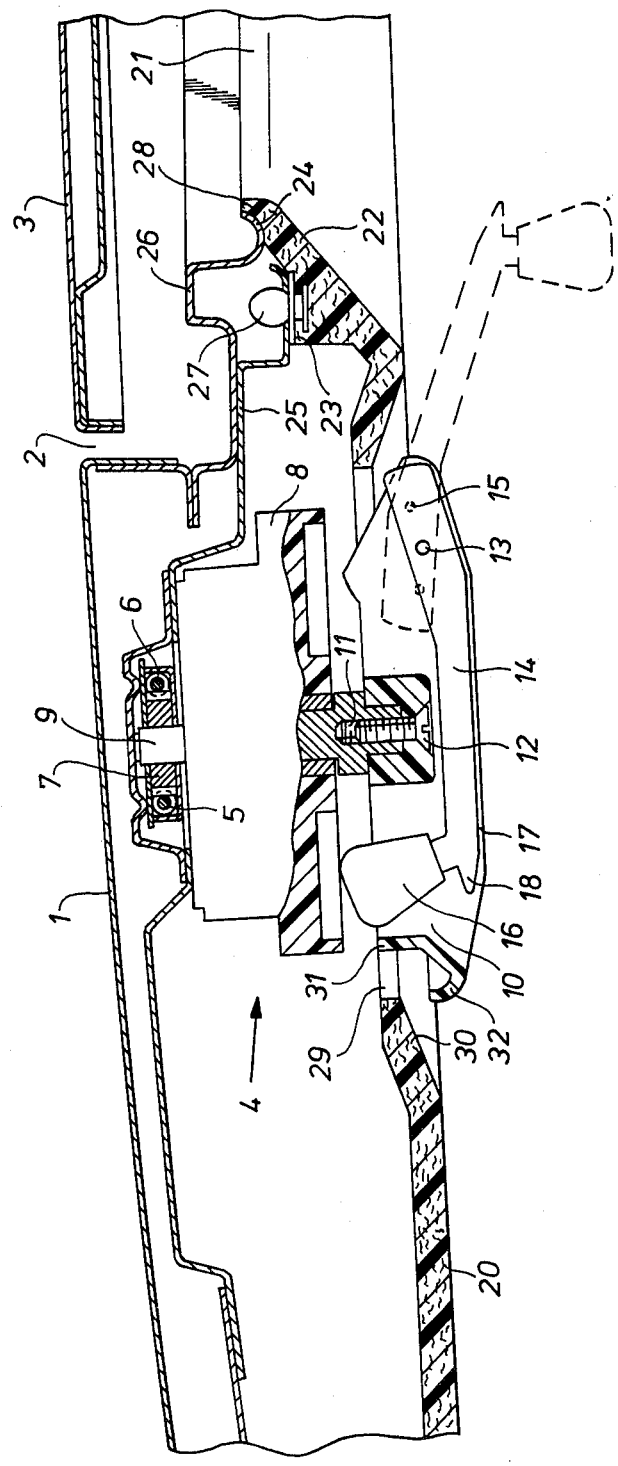
FIG. 1 shows a longitudinal section through an automobile roof in the zone of the front edge of a roof aperture.
Figure 2:
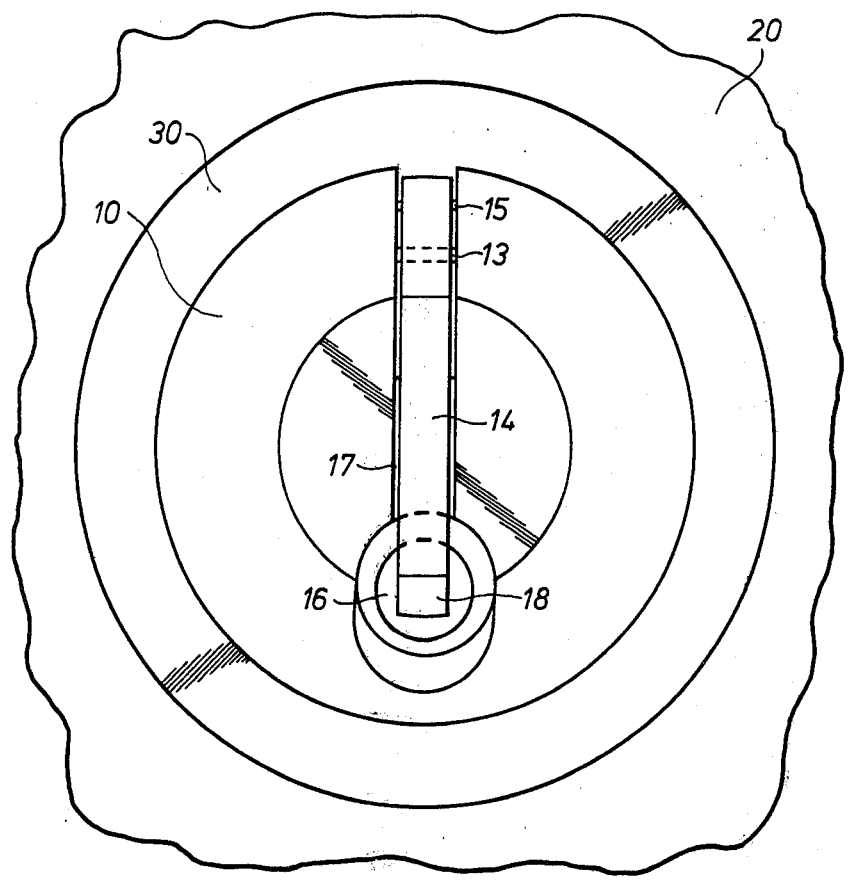
FIG. 2 shows a view of the arrangement according to FIG. 1, seen from below.

The automobile roof 1 exhibits a rectangular roof aperture 2 which can be sealed by a closure panel 3. The closure panel 3 can be displaced by means of a crank handle mechanism 4 via threaded cables 5, 6 and/or it can be thus swung out with its rear edge over the plane of the roof 1. The pressure-resistant threaded cables 5, 6 are connected for this purpose with the closure panel 3 in a conventional way (German Utility Model 7,910,722 or commonly assigned U.S. application, Ser. No. 10,468, filed Feb. 8, 1979 for example), so that no detailed explanations are required in this respect. The threaded cables 5, 6 are in engagement with a gear wheel 7 attached to a shaft 9 rotatably mounted in a gearbox 8. A round anchor plate 10 is attached to the lower end of the shaft 9, this plate being joined to the shaft 9, for example, via a square end in a shapemating fashion and is held by means of a screw 12 engaging into a threaded bore 11 of the shaft 9. The round anchor plate 10 is connected to a crank arm 14 via a pivot pin 13.

The crank arm 14 suitably carries a locking element 15 optionally resiliently biased in the transverse direction, this locking element being insertable in corresponding detents of the round anchor plate 10 in order to hold the crank arm 14 selectively in the folded position or in the in-use position indicated in dashed lines. In the folded position, the crank arm including a crank end 16 is received in a hiding niche 17 formed by the round anchor plate 10. A lug 18 at the location of the crank end of the crank arm 14 facilitates the unfolding of the crank arm 14.

The underside of the roof is covered by a roof headliner 20 consisting of a rigid, resilient material, preferably a synthetic resin. The roof headliner 20 has a cutout 21 corresponding substantially to the roof aperture 2. To mount the roof headliner 20 in the zone of the roof aperture 2, the roof headliner is provided at least along the front edge and the lateral edges of the cutout 21 with an upwardly directed bent portion 22. Upwardly directed portion 22 has shoulders 23, 24 that are shaped to engage against corresponding parts of an inverted trough 25 carrying the panel displacement drive (crank-drive 4, FIG. 1) and/or of a frame 26 encompassing the roof aperture 2, the shoulders being connected with these fixed roof members via clips, one of which is illustrated at 27.

The roof headliner 20 is provided, in the region located in front of the forward edge 28 of the cutout 21 (viewed with reference to the vehicle front end), with a substantially circular perforation 29. This perforation is positioned so that it will be coaxial with the shaft 9 of the drive mechanism 4 when installed in the vehicle. The edge of the perforation 29 is formed by a upwardly projecting rabbet having a surface 30 that is beveled inwardly in a conical fashion. The round anchor plate 10 has a hub 31 which extends into the perforation 29, whereas a flange section 32 of the round anchor plate projects radially outwardly past the rim of the perforation 29 and thus covers the latter.

Figure 3:
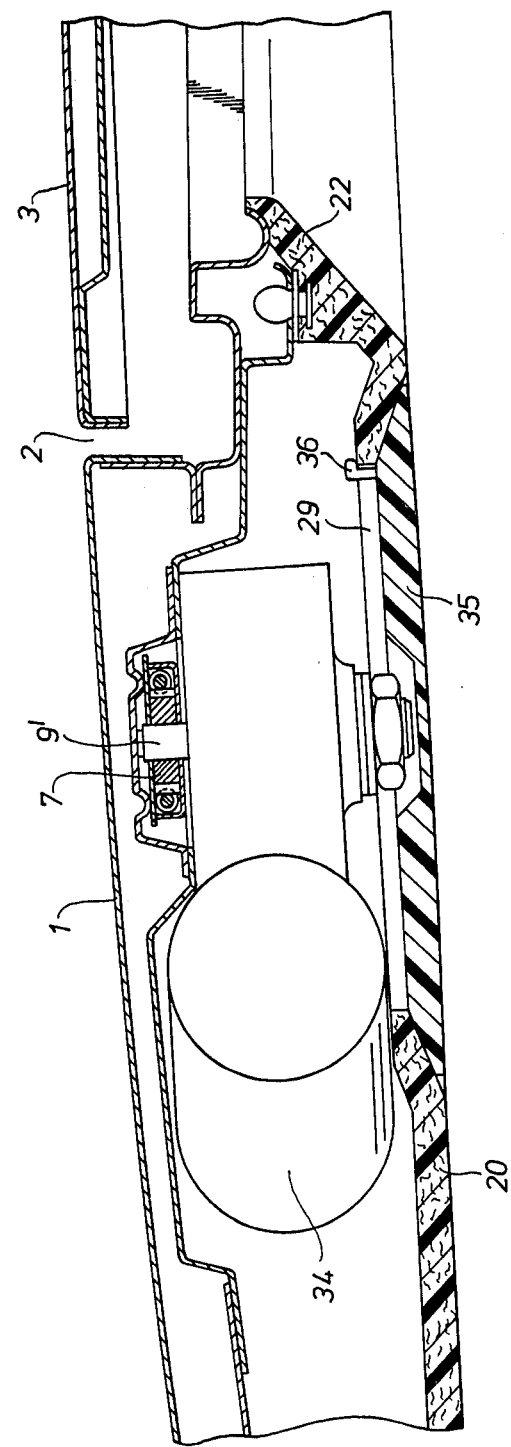
FIG. 3 is a longitudinal sectional view similar to FIG. 1 with the use of a motorized drive mechanism.

If it is desired to employ a motorized drive mechanism in place of a crank handle mechanism, as indicated at 34 in FIG. 3, it is unnecessary to use a roof headliner specifically tailored to such a motorized drive mechanism. Rather, the same finished headliner 20 can be utilized as also employed in conjunction with the crank handle mechanism 4. In such a case, the perforation 29 is covered by a shield 35 that is detachably connected to the roof headliner 20 by way of fastening elements 36 which, in the FIG. 3 embodiment are resilient hook-shaped tabs, will engage an inner side of the perforation edge when shield 35 is pushed in place. The shield 35 can be removed, if necessary, for example to turn the shaft 9 by way of an attachable hand crank in case of failure of the motorized drive.

Optionally, the outer diameter of the round anchor plate, the diameter of the perforation 29, and the size of the motorized drive mechanism 34 can be adapted to one another in such a way that, with a roof headliner identical for crank handle and motorized drive mechanisms, the motorized drive mechanism 34 can be dismounted and removed through the perforation 29 and another exchanged therefor.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

We claim:

1. An automobile roof with a roof aperture, a closure panel that is displaceable for opening and closing said aperture, said panel being interchangeably displaceable by means of a crank handle mechanism and a motorized drive mechanism, and with a roof headliner covering the underside of the roof and comprising a rigid, resilient material, said headliner having a cutout essentially corresponding in shape and position to the roof aperture, wherein the roof headliner is provided in a zone lying, with reference to the front and rear of the vehicle, in front of a forward edge of the headliner cutout, with a substantially circular perforation into which fits a round anchor plate for a foldable crank arm constituting part of the crank handle mechanism, said crank arm, in a folded position, being received by a hiding niche formed in the round anchor plate; and wherein a shield is provided for covering the perforation when using the motorized drive mechanism in place of said crank handle mechanism.

2. Automobile roof according to claim 1, characterized in that an edge of the perforation is formed by a rabbet projecting in a direction toward the roof underside.

3. Automobile roof according to claim 2, characterized in that the rabbet has a lower surfact that extends conically upwardly.

4. Automobile roof according to one of claims 1 or 2 or 3, characterized in that the round anchor plate comprises a hub, the outer diameter of which is smaller than the diameter of the perforation, and a flange section which projects radially and lies underneath the perforation, the outer diameter of this flange section being larger than the diameter of the perforation.

5. Automobile roof according to claim 1, wherein said shield is provided with fastening means for detachable fastening said shield to the headliner in a position closing said perforation.

6. In a headliner for covering the underside of automobile roofs having a roof aperture, and a closure panel that is displaceable for opening and closing the aperture by means of a crank handle or motorized drive mechanism, of the type formed of a rigid, resilient material and having a cutout that essentially corresponds in shape and position to the roof aperture, the improvement for enabling said headliner to be useable with both crank handle drive mechanism equipped and motorized drive mechanism equipped roofs comprising a perforation in said headliner having a diameter greater than that of a hub of a crank arm of said crank handle mechanism and located so as to be substantially coaxial with a drive shaft of the drive mechanism in an installed condition, and a cover shield that is detachably fastenable within said perforation so as to close same, whereby said headlining can be utilized with crank handle drive mechanism equipped roofs with said cover shield detached and with motorized drive mechanism equipped roofs with said cover shield attached.

7. Headliner according to claim 6, wherein said perforation is circular.

8. Headliner according to claim 7, wherein said perforation is surrounded by an upwardly projecting rabbet having a conical lower surface and said cover shield has a complementarily shaped conical upper edge surface for enabling said cover shield to be flush with the underside of the heading when installed.

9. Headliner according to claim 6 or 8, wherein the headliner is provided with clips for connection with fixed roof members and an upwardly directed portion that has shoulders shaped for engagement against correspondingly shaped parts of said fixed members including parts carrying said drive mechanism, said clips being secured to said upwardly directed portion.

* * * * *